United States Patent [19]

Henmi et al.

[11] Patent Number: 5,390,027
[45] Date of Patent: Feb. 14, 1995

[54] TELEVISION PROGRAM RECORDING AND REPRODUCING SYSTEM USING PROGRAM DATA OF TEXT BROADCAST SIGNAL

[75] Inventors: Hidemi Henmi, Shiga; Shigeru Takano, Osaka; Hideto Nakahigashi, Osaka; Ken Sakamoto, Osaka, all of Japan

[73] Assignee: Matsushita Electric Industrial Co., Ltd., Osaka, Japan

[21] Appl. No.: 92,882

[22] Filed: Jul. 19, 1993

Related U.S. Application Data

[63] Continuation-in-part of Ser. No. 799,996, Nov. 29, 1991, Pat. No. 5,260,788, and Ser. No. 748,188, Aug. 20, 1991, abandoned.

[30] Foreign Application Priority Data

Aug. 23, 1990 [JP] Japan ................. 2-223170
Nov. 29, 1990 [JP] Japan ................. 2-333906

[51] Int. Cl.⁶ .................................................. H04 5/76
[52] U.S. Cl. .................................................. 358/335
[58] Field of Search ............... 358/310, 335, 342, 311; 360/32, 10.3, 10.2, 13; 348/563, 564, 569, 570

[56] References Cited

U.S. PATENT DOCUMENTS

| | | |
|---|---|---|
| 4,543,616 | 9/1985 | Brooks . |
| 4,554,660 | 11/1985 | Noirel et al. . |
| 4,777,537 | 10/1988 | Ueno et al. ........................... 358/341 |
| 4,890,168 | 12/1989 | Inoue et al. . |
| 4,908,712 | 3/1990 | Levine . |
| 4,982,074 | 1/1991 | Ogasawara ........................... 235/454 |
| 5,036,394 | 7/1991 | Morii et al. . |
| 5,038,231 | 8/1991 | Harigaya et al. . |
| 5,079,651 | 1/1992 | Tsuchida et al. . |
| 5,253,066 | 10/1993 | Vogel ..................................... 348/564 |

FOREIGN PATENT DOCUMENTS

| | | |
|---|---|---|
| 0337336 | 10/1989 | European Pat. Off. . |
| 0368313 | 5/1990 | European Pat. Off. . |
| 3335082 | 4/1985 | Germany . |
| 3623108 | 10/1987 | Germany . |
| 4-105285 | 4/1992 | Japan . |
| 4-200082 | 7/1992 | Japan . |
| 2212649 | 7/1989 | United Kingdom . |

OTHER PUBLICATIONS

WO-A-9 015 507 (Right Hemisphere Pty. Ltd.) *p. 3, line 14–line 25*, *p. 5, line 20–line 29*, *p. 7, line 14–line 33*, *FIGS. 1,3*.
Patent Abstract of Japan, vol. 8, No. 29 (E-226) 7 Feb. 1984 & JP-A-58 191 585 (Sony) 8 Nov. 1983 *abstract*.
Patent Abstract of Japan, vol. 13, No. 381 (E-810) 23 Aug. 1989 & JP-A-11 30 684 (Matsushita Electric Ind., Co., Ltd.) 23 May 1989 *abstract).

*Primary Examiner*—Tommy P. Chin
*Assistant Examiner*—Robert Chevalier
*Attorney, Agent, or Firm*—Wenderoth, Lind & Ponack

[57] ABSTRACT

Television program information contained in an extracted text broadcast signal is selected and input to a video cassette recording device. The recording program information includes recording times and program titles. The recording device includes a timer for starting the recording of the television program on a tape in accordance with the recording information, an index detector for detecting an index along the tape to identify a section in the tape where the television program is recorded, a rewind controller for rewinding the tape to its initial position, a writing arrangement for writing the recording information of the recorded program together with the index information at the initial position of the tape, and a fast forward controller for advancing the tape to the end of the recorded section identified by the index. The recording information written at the initial position of the tape can be displayed on a screen to indicate the contents of the tape.

7 Claims, 11 Drawing Sheets

*Fig. 7*

```
              List of Recorded Programs
                     (Tape No. 1)

1.  Country Site in Japan     Feb 16  (Fri)
         2.  World News                Feb 21  (Tue)
         3.  Travel Quiz               Mar  7  (Wed)
         4.  President of USSR         Mar 15  (Thr)
         5.  NBA Basketball            Mar 15  (Thr)
        108a
```

*Fig. 9*

```
   TELETEXT                             931#-04/09
   CH-2  NHK        TV PROGRAM          Dec 1 (Fri)

Time      Code           Title

14:00      22    What is happening in USA now
   15:00      23    Tokyo market information
   15:40      24    World News
   16:00      25    Country Site in Japan
                       (Hokkaido)
   17:00      26    World Documentary
   18:00      27    NBA Basketball
             123a
```

TELEVISION PROGRAM RECORDING AND REPRODUCING SYSTEM USING PROGRAM DATA OF TEXT BROADCAST SIGNAL

CROSS-REFERENCE TO RELATED APPLICATIONS

This is a continuation-in-part application of copending applications Ser. No. 07/799,996, filed Nov. 29, 1991 and now US. Pat. No. 5,260.788, and Ser. No. 07/748,188, filed Aug. 20, 1991 and now abandoned.

BACKGROUND OF THE INVENTION

1. Field of the Invention

The present invention relates to a television program recording and reproducing system for recording a television program on a magnetic tape based on television program data form a text broadcast signal, and more particularly, to such a system which is arranged to make the contents of recorded programs readily available by displaying a list thereof, and to reproduce a desired program from its beginning by selecting the desired program from the list of recorded programs.

2. Description of the Related Art

Text broadcasts which use conventional television frequencies to provide static image data including text and graphics have become commercially available in recent years, and television receivers having a built-in text broadcast reception function have been developed and marketed.

A conventional text broadcast receiver is described hereinbelow with reference to the accompanying figures. FIGS. 2a and 2b illustrate the text broadcast data transmission procedure and describe the data transmission sequence in text broadcasting.

Text broadcast data is transmitted in four vertical blanking periods, 14H (277H) through 16H (279H) and 21H (284H), of the conventional television signal. In each 1H of the four blanking periods, the following text broadcast data are multiplexed: synchronization data; prefix (PFX); data block; and check code. The check code is used for error correction and data block extraction, and the data block which carries the informative data is combined with the data block obtained from another 1H line to form a data group. Each data group comprises the data group header, data header, and data unit. The data group header includes a data group identification code which indicates whether the data following the header is program management data, page data, or program index data. The data header shows the program number of the following data unit, and contains a data header parameter which indicates whether the data unit is program management data, page data, continued data, or program index data. The data unit is the collection of data which is actually processed, and is classified by the data unit parameter indicating the data type (e.g., text, melody, photographic).

The construction of a conventional text broadcast receiver is described below.

FIG. 4 is a block diagram of a conventional text broadcast receiver including: a data extraction section 20 for extracting the text broadcast signal multiplexed with vertical blanking periods of the video signal, applying error correction, and extracting the data block; a data group construction section 21 for constructing the data groups from the data blocks extracted by the data extraction section 20; a data identifier section 22 for identifying whether a data group constructed by the data group construction section 21 is program index data or page data, in accordance with the information obtained from a data group identification code, data header parameter, data unit parameter, and program number data; a program index processing section 23 for processing program index data so as to manage the program numbers of the text broadcast programs transmitted on that channel; a decoding section 24 which processes the page header and interprets the text, melody, and photographic data according to the type thereof as identified by the data unit parameter; and a display controller 25 which converts the data interpreted by the decoding section 24 to display data (RGB data) for viewing on the display device.

The operation of the conventional text broadcast receiver described above will now be explained. The first operation step is extraction of the text broadcast signal multiplexed with the vertical blanking period of the input video signal by the data extraction section 20, followed by error correction and data block extraction. Data groups are then constructed from the extracted data blocks by the data group construction section 21. The data identifier section 22 then determines, using the data group identification code in the data group header and the data header parameter and program number information in the data header, whether the data group is program index data or page data. If the data group is program index data, program number data management processing is applied for the text broadcasts on that channel by the program index processing section 23; if the data group is page data, the decoding section 24 applies interpretative processing to the encoded text, graphic, sound, and other data according to the data type (including text, melody, photographic) identified by the data unit parameter. The interpreted page data is then converted by the display controller 25 to data (RGB data) for display on the display device.

Text broadcasts offering a variety of information services, including news and weather reports, are thus provided by transmitting data according to the transmission procedure thus described for interpretation of the encoded text and graphic information according to the transmission procedure by the text broadcast receiver for display of static image data on the television screen.

More recently, however, there have been proposals to further expand text broadcasting services while maintaining compatibility with existing text broadcast standards by expanding the transmission protocol (defining new transmission parameters); one such service makes it easier to set VCR recording reservations by encoding television program table information (including program titles and the date and time of the broadcast) and transmitting this data as the data unit data. Unfortunately, however, conventional text broadcast receivers are not compatible with such expanded transmission standards, and these users are therefore unable to utilize such new services.

At the same time, however, the typical procedure followed to set a VCR recording reservation is complicated and hard to understand, making it difficult for novices and people unaccustomed to video and audio equipment to use the VCR timer recording functions. There is therefore a strong consumer desire for a simplified recording reservation operation.

There is also a consumer demand for a television program recording and reproducing system which is capable of easily displaying the contents of recorded programs and easily reproducing a desired recorded program from its beginning. That is, television programs are often recorded in a recording medium, such as a magnetic video tape. However, when a plurality of programs are recorded on a plurality of tapes, it is difficult to know on which tape and where on the tape any particular program is recorded unless the tapes are well organized.

Hereinbelow, an example of the conventional television program recording and reproducing system will be described with reference to FIG. 5.

FIG. 5 is a block diagram showing the construction of a conventional television program recording and reproducing system, which includes: a recording time information input means, or a timer, 201 for inputting recording information such as channel, date, recording start time, recording end time, program title to be recorded, etc., for recording television signals; a recording operation control means 202 for starting or ending the recording operation based on the recording time information inputted by the recording time information input means 201; an index write-in means 228 for writing a search index information indicating the recording start position into a recording medium at the start of recording; an index read-out means 205 for reading out, at the start of reproducing, the index information written in by the index information write-in means 228; an index input means 29 for inputting the index number of the recorded program that is desired to be reproduced; an index search means 211 for searching the index number inputted by the index input means 229 from the recording medium; a stop/reproduce means 212 for stopping the search and reproducing the program which is found by the index search means 211; and a recording/reproducing section 213 for recording a television signal on a recording medium and for reproducing the recorded television signal.

The operation of such a television program recording and reproducing system will now be described.

In FIG. 5, when a television program is recorded using the timer 201, the recording program information such as channel, date, recording start time, recording end time, etc., are first inputted by the timer 201. The recording operation control means 202 reads the program as stored in the timer 201 and operates the recording/reproducing section 213 to record the program when the time comes. The index input means 229 operates at the recording time and reproducing time such that, during the recording, the index number as specified by the index input means 229 is recorded by the index write-in means 228, and during the reproducing, the index number having been written in by the index write-in means 228 is read out by the index read-out means 205 and the index number specified by the index input means 229 is search by the index search means 211.

When the index number specified by the index input means 229 and the index number detected by the index search means 211 match with each other, the searching stops and the reproducing starts by the stop/reproducing means 212.

However, the prior art system as described above has the following problems. By the above arrangement, it is not possible to record index numbers at the time of setting the timer. Furthermore, since the contents of recorded programs are not readily displayable, it is necessary to reproduce the recorded medium each time to know the contents thereof, or it is necessary to apply a label indicating the recorded contents on the tape (recording medium).

Furthermore, in the case where a plurality of programs are recorded on a single tape, a problem arises in that the searching for the beginning of the desired program takes time and labor.

SUMMARY OF THE INVENTION

The present invention has been developed in view of the above-described problems, and an essential object of the present invention is to provide a television program recording and reproducing system which is arranged so that, at the time recording a television program set in a timer, program information and index numbers identifying the section in the tape where the program is recorded are automatically recorded on the recording medium, so that the contents of the recorded programs in the recording medium can be known when the recording medium is inserted in a reproducing apparatus.

Another object of the present invention is to provide a television program recording and reproducing system which is capable of simplifying the adding of recording information of the television program.

In order to achieve the aforementioned objective, according to the present invention, a television program recording and reproducing system records a television program on a magnetic tape based on a television program data contained in a received video signal, and includes: a data extraction means for extracting a data block in an encoded in an encoded transmission-format text broadcast signal multiplexed with a vertical blanking period of a video signal; a data group construction means for constructing a data group by assembling a plurality of extracted data blocks; a data identifying means for identifying said data group and including a gate means for passing said data group when said data group is identified as containing a television program table, said program table including recording information with respect to at least one television program, said recording information including a channel information and a program start time and a program end time for each of said at least one television program; a memory means for storing said recording information of said television program table contained in said data group passed through said gate means of said data identifying means, said memory means including respective memory areas for storing said channel information and and said program start time and said program end time for each said television program of said television program table; selecting means for selecting a television program from said memory means; recording program information input means for inputting from the memory means the recording information associated with the television program selected by said selecting means; time detecting means for detecting a time at which recording of the selected television program is to start based on the program start time of said recording information input by said recording program information input means; recording operation control means for controlling the recording of the selected television program in accordance with said time detecting means and said recording program information input by said recording program information input means; index detecting means for detecting an index location on the magnetic tape to identify a section on the magnetic tape where the selected television program is recorded by said recording operation control means; initial position returning means returning the magnetic tape to an initial position form the section on the magnetic tape where the selected television program is recorded by said recording operation control means; and information writing means for writing the recording information of the selected television program together with the index location at the initial position of the magnetic tape.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1b is a diagrammatic view showing an arrangement of a memory used in the text broadcast receiver of FIG. 1a;

FIG. 1c is a diagrammatic view showing an arrangement of a remote control device used in the text broadcast receiver of FIG. 1a;

FIG. 7 is a diagram showing an example of a display on a screen of a list of recorded programs;

FIG. 9 is a diagram showing an example of a display on a screen of a television program.

DETAILED DESCRIPTION OF THE PREFERRED EMBODIMENTS

The preferred embodiment of the present invention is described hereinbelow with reference to the accompanying figures.

A television program recording and reproducing system according to the present invention will first generally be described with reference to FIGS. 8 and 9. The invention will then be described in greater detail with reference to FIGS. 1-3c and 6-7.

Figure 8:
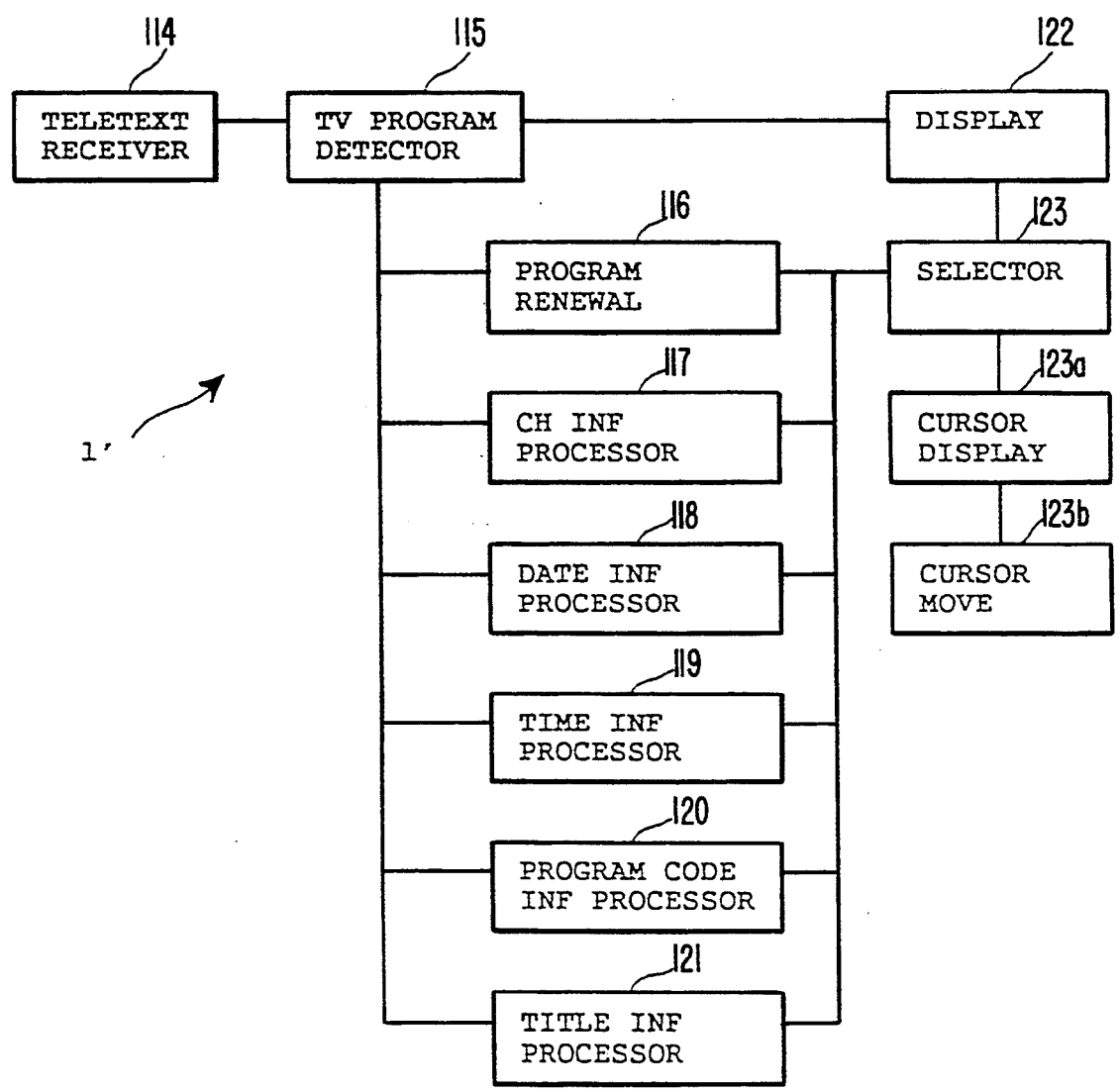
FIG. 8 is a block diagram of a recording time input device of the television program recording and reproducing system according to the present invention.

Referring to FIG. 8, a recording time information input means 1' according to the present invention includes a receiver 114 for receiving the text broadcasting of coded transmission system. In the receiver 114, the text information superimposed in the vertical return blanking period in the television signal is extracted, and the extracted character signal is decoded so as to develop into a text figure for display. The input means 1' further has: a television program detector 115 for detecting the television program information from the receiver 114; a program renewal processing means 116 for updating the program information from the data of the data unit detected by the program detector 115; a channel information processing means 117 for processing the channel information from the data unit data detected by the program recognition means 115; a date information processing means 118 for processing the date information from the data unit data detected by the program detector 115; a time information processing means 119 for processing the time information from the data unit data detected by the program detector 115; a program code information processing means 120 for processing the program code information from the data unit data detected by the program detector 115; a title information processing means 121 for processing the title information from the data unit data detected by the program detector 115; a display means 122 for displaying the data processed by the program detector 115 on the screen; and a selector 23 coupled with a cursor display means 123a and a cursor moving means 123b for selecting the program from the television program list on the screen as displayed by the display means 122.

The operation of the input means 1' of the television program recording and reproducing system as described above will be given below with reference to FIGS. 8 and 9.

First, the receiving means 114 extracts text signals from the received television signal. From the extracted text signals, the program detector 115 detects the television program list data unit carrying the program information of the television broadcasting. The detected television program list data unit is applied to the display means 122 for displaying the television program such as in a manner shown in FIG. 9. The selector 123 coupled with the cursor display means 23a and cursor moving means 23b selects a desired program on the screen by pointing a program using the cursor 123a. The selected program is marked in the program detector 115 so that, with respect to the marked program, the channel information processing means 117 reads the channel information; the data information processing means 118 reads month and day information; the time information processing means 119 reads the start time (hour and minute) information, and end time (hour and minute) information; the program code information processing means 120 reads the program code information; and the program title information processing means 121 reads the program title information. The read program information is stored in a first area in a memory (e.g. a memory 124 shown in FIG. 6 as described later). The above operation is repeated to store a plurality of programs for recording.

In the case where the program time schedule changes, such as when a boxing relay broadcasting is extended to defer the programs following thereafter, the broadcasting station sends renewed time information of the programs through the text broadcasting signal. Before starting the recording of each program, the system (e.g., a system control 125 shown in FIG. 6 as described later) checks if the starting time of the stored program is the same as the starting time information of the same program now being broadcasted through the test broadcasting signal by matching the code number. If the starting time is changed, the program renewal processing means 16 reads the renewed information and replaces the old information with the new information. Thus, the recording of the program can be carried out from the beginning to the end even when the starting time of the program is changed.

As described above, by detecting the program information from the text broadcasting information, it is possible to easily store and write program information.

The invention will now be described in more detail with reference to FIGS. 1-3c and 6-7.

First, the television program table transmission procedure is described with reference to the text broadcast data transmission procedure diagram shown in FIGS. 2a and 2b. At the television broadcasting station, the television program table data is formed in a format shown in FIG. 2a. The format of the television program table data is arranged in a data group which is compatible with that of the other conventional text broadcast data. The basic transmission procedure is therefore the same as in conventional text broadcasting as described hereinabove. Only those points which differ are described below.

Figure 2A:
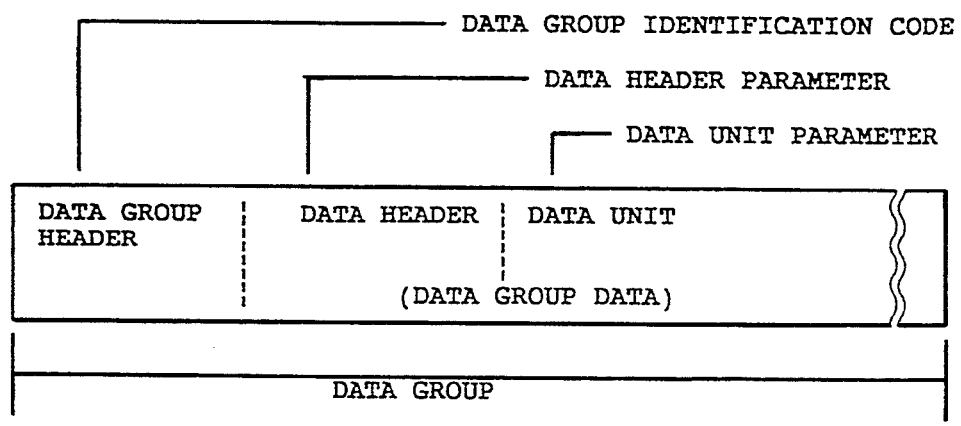
FIG. 2a is a schematic view showing a format of a text data.

As shown in FIG. 2a, the television program table data group is comprised of a data group header, data header, and data unit. Of these parameters, the data group header contains a data group identification code (hereinafter ID code) which indicates whether the data following the data group header is program management data, page data, program index data, or a new code used to indicate that the following data is a television program table.

Similarly, the data header contains a data header parameter which indicates whether the data unit following thereafter is program management data, page data, continued data, program index data, or a new code used to indicate that the following data unit is a television program table.

The data unit is the data set which is actually processed, and contains data unit parameters identifying the data type (e.g., text, melody, photographic). The encoded television program table data is accommodated in this data unit if the data group is for the television program table data.

Thus, the data group header, data header, and data unit parameters are extended to enable television program table data transmission while maintaining compatibility with conventional text broadcasts.

Figure 2B:
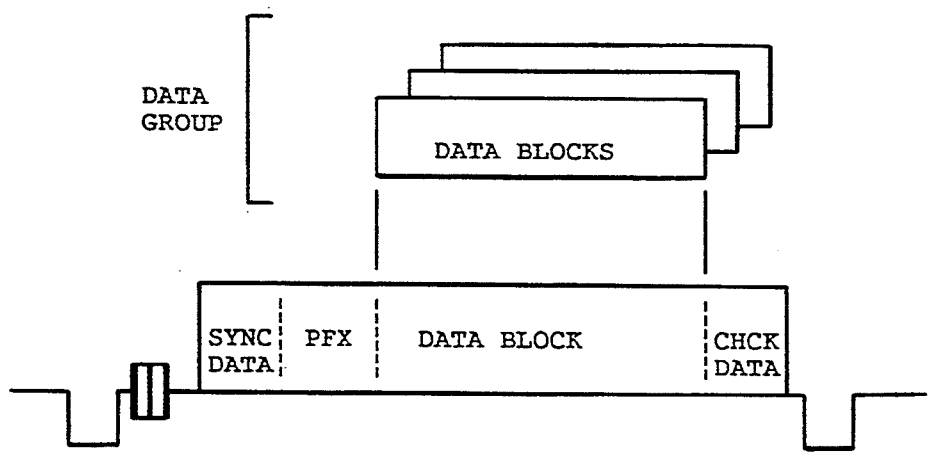
FIG. 2b a schematic view showing a manner in which a segment of the text data is carried in a television signal.

As shown in FIG. 2b, for broadcasting the data group, the data group is divided into a plurality of data blocks and each data block is multiplexed in one of the vertical blanking period. By using a plurality of vertical blanking periods, one data group of the television program table data is broadcasted. described.

The text broadcast receiver comprises a data extraction section 1 for extracting the text broadcast (television program table) signal multiplexed in vertical blanking periods of the video signal and for applying error correction, if any, to the extracted data block. A data group construction section 2 assembles the extracted data blocks together to construct the data group. A data identifier section 3 detects a data group identification code, data header parameter, and data unit parameter, and identifies whether a data group, constructed by the data group construction section 2, is program index data, page data, or television program table data. A program index processing section 4 processes program index data to manage the program numbers of the text broadcast programs transmitted on that channel. A decoding section 5 processes the page header and interprets the text, melody, and photographic data according to the type thereof as identified by the data unit parameter.

According to the present invention, the text broadcast receiver further includes a program table data memory 6 which stores television program table data when the received data group as identified by the data identifier section 3 is a television program table data. As shown in FIG. 1b, memory 6 has an area for storing a first flag for indicating the completion of the recording of the past television program, an area for storing a second flag for indicating the reservation for recording a future television program, an area for storing the channel, an area for storing the date, an area for storing a start time, an area for storing an ending time, and an area for storing the title.

A recording reservation command section 7, such as a remote control device, produces a command signal specifying a recording reservation for a television program. As shown in FIG. 1c, an example of the recording reservation command section 7 arranged in a remote control device is shown, which includes a program call button 7a, a select button 7b, a data recording reservation for a television program. As shown in FIG. 1c, an example of the recording reservation command section 7 arranged in a remote control device is shown, which includes a program call button 7a, a select button 7b, a data up button 7c, data down button 7d and a track ball 7e.

A program table data control section 8 determines which address in the memory 6 is used to store the newly obtained television program table data and, at the same time erases the old television program table data.

A recording reservation setting section 9 searches, when the user enters a recording reservation by means of the recording reservation command section 7, the contents of the program table data memory 6 by means of the program table data control section 8, and automatically sets the display data indicating whether or not the television program table is stored, and controls the recording reservation operation.

A display controller 10 converts the data from the decoding section 5 and recording reservation setting section 9 to display data (RGB data) on a screen (not shown).

The normal operation of a text broadcast receiver thus configured according to the present invention is described hereinbelow.

The first step as carried out by the data extraction section 1 is the extraction of the data block carrying the television program table data from the vertical blanking period of the received television signal. Error correction is then applied and the data blocks are extracted. Then, by assembling the extracted data blocks, a data group is constructed in the data group construction section 2. The data identifier section 3 then determines, using the data group identification code in the data group header, the data header parameter in the data header, and the data unit parameters in the data unit, the type of the data group, e.g., program index data, page data, or television program table data. If the data group is program index data, the data group is sent to the program index processing section 4 in which the program number data management processing is applied for the text broadcasts on a received channel. If the data group is page data, the data group is sent to the decoding section 5 which applies decoding processing to the encoded text, graphic, sound, and other data according to the data type (including text, melody, photographic) identified by the data unit parameter. The decoded page data is then converted by the display controller 10 to viewable data (RGB data) for display on the screen.

If the received data group as identified by the data identifier section 3 is the television program table data, the data group is applied to the program table data memory 6 in which the television program table data is stored to as controlled by the program table data control section 8.

The operation when setting a VCR timer recording reservation is described next.

Figure 3A:
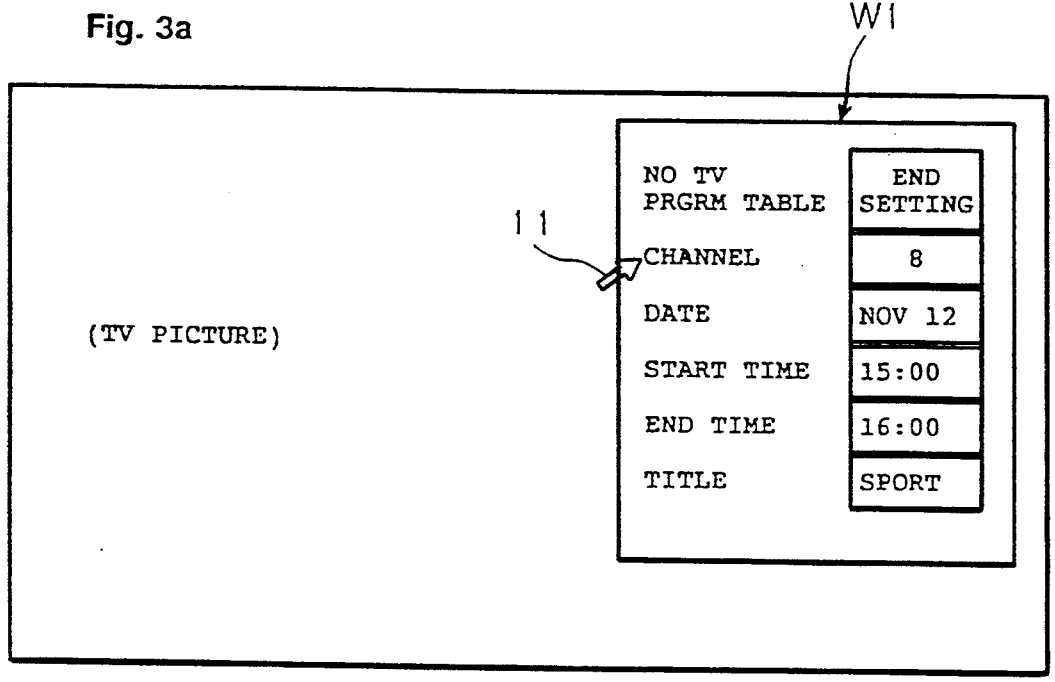
FIG. 3a is a diagrammatic view of a television screen showing a timer recording reservation window without a television program table.
Figure 3B:
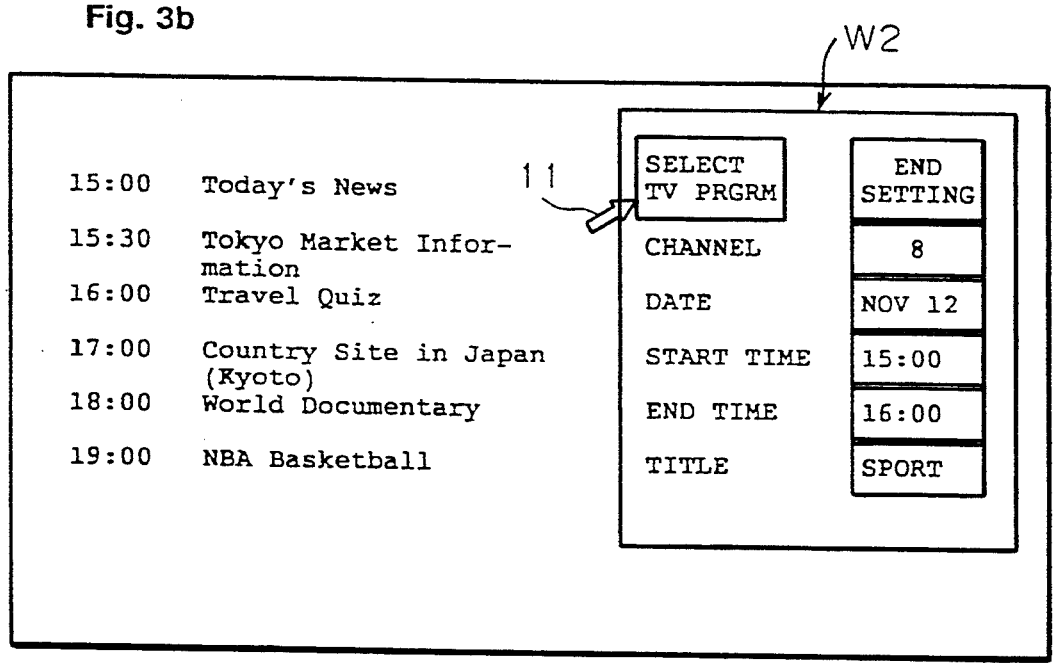
FIG. 3b is a diagrammatic view of a television screen showing a timer recording reservation window with a television program table.

When the user depresses the program call button 7a, a window W1 shown in FIG. 3a or a window W2 shown in FIG. 3b appears on the screen. FIG. 3a shows a case in which the program table data memory 6 is carrying no television program table because, for example, the text broadcast television program table service is not provided on the corresponding channel, and FIG. 3b shows a case in which memory 6 is carrying the television program table.

First, the case shown in FIG. 3a is explained. In this case, "NO TV PRGRM TABLE" is indicated in the top of the window W1. By turning the track ball 7e, a pointer 11 is moved to one of a plurality of items, such as "CHANNEL", "DATE", "START TIME" and "END TIME". Then, the data up button 7c or data down button 7d is depressed to change the data to a required data. For example, for changing the data corresponding to "CHANNEL", pointer 11 is moved to "CHANNEL", and data up button 7c or data down button 7d is depressed to increase or decrease the channel number indicated in the small window next to "CHANNEL". After all the data in the window W1 is set, the select button 7b is depressed so as to make one reservation of the television program. The data set for the reservation is stored in memory 6 with a second flag being turned on. After making one or more reservations, the pointer 11 is moved to "END SETTING" and the select button 7b is depressed to close the window W1.

Figure 3C:
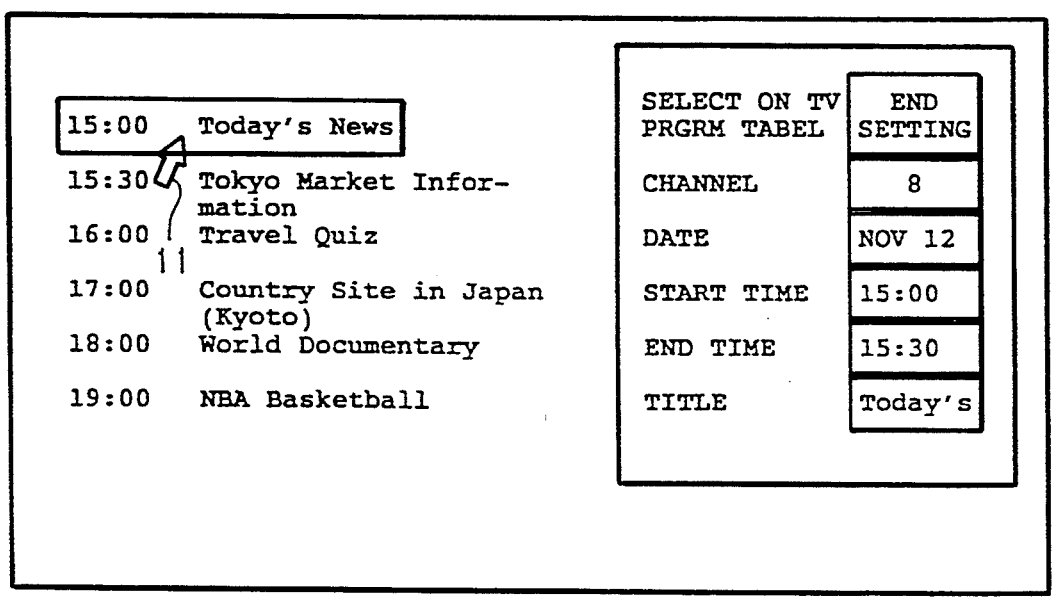
FIG. 3c is a diagrammatic view similar to FIG. 3b, but particularly showing a pointer positioned to a program for the recording reservation.
Figure 4:
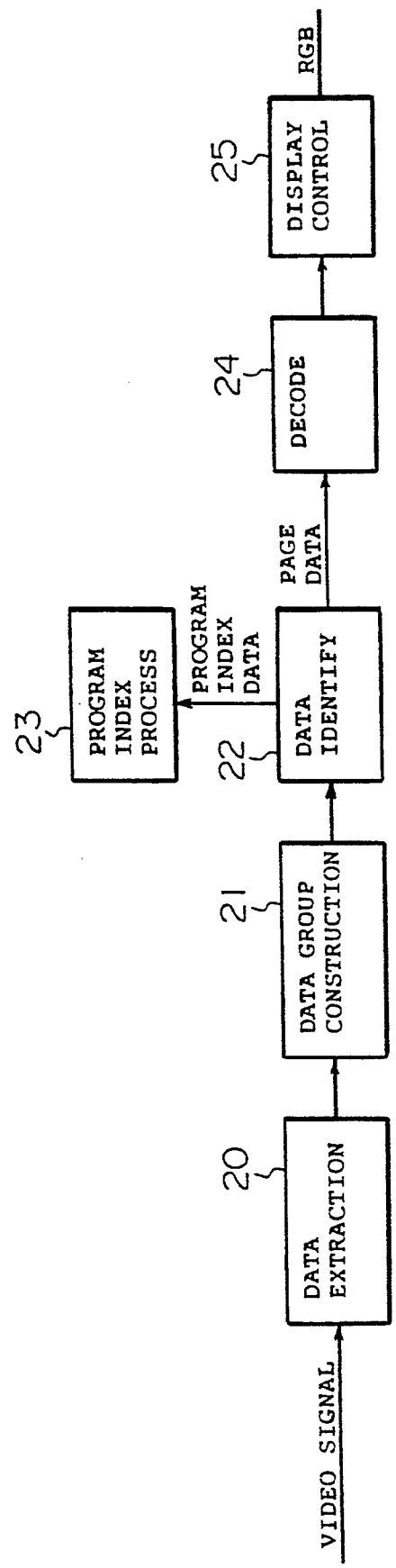
FIG. 4 is a block diagram of a conventional text broadcast receiver.
Figure 5:
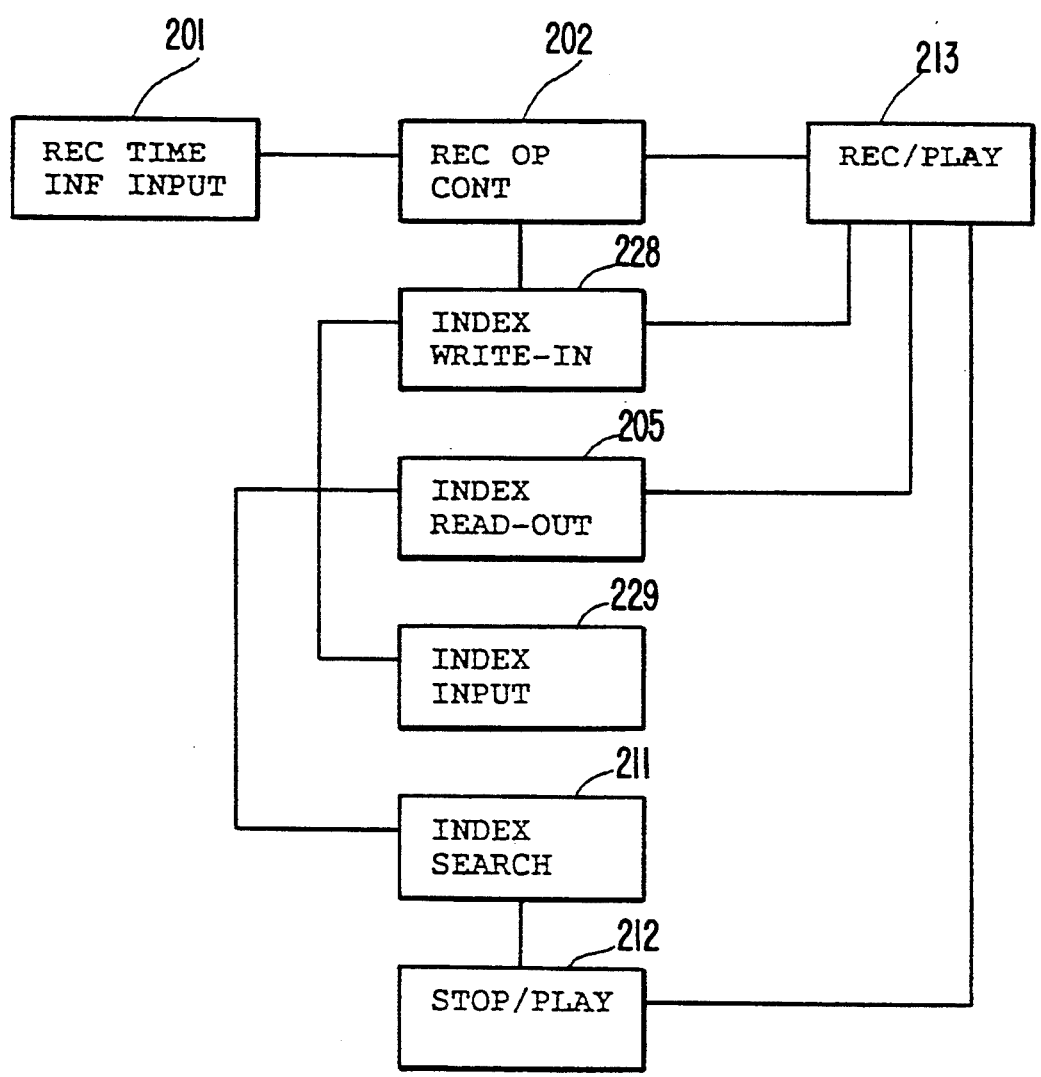
FIG. 5 a block diagram of a prior art television program recording and reproducing system.

Next, the case shown in FIG. 3b is explained. By turning the track ball 7e, pointer 11 is moved to "SELECT TV PRGRM" and select button 7b is depressed to enable the selection of the television programs from the television program table shown in the screen. By changing the channel number indication at a small window corresponding to "CHANNEL" in the above described manner, the television program table shown in the screen is varied for showing the program tables of different channels. By changing the date indication at a small window corresponding to "DATE", the television program table shown in the screen is varied to the designated date, if available. Similarly, by changing the indication at a small window corresponding to "START TIME" the table is scrolled up and down to shown different hours. The above display control is effected in the recording reservation setting 9. When a desired television program is indicated in the table, pointer 11 is moved to point the desired program, as shown in FIG. 3c. Then, select button 7b is depressed to set the second flag in the memory 6 at a place corresponding to a second where the desired television program is stored. After making one or more reservations, the pointer 11 is moved to "END SETTING" and the select button 7b is depressed to close the window W2.

After one or more programs are reserved by setting the second flag, the data of the reserved programs are converted by the display controller 10 to screen display (RGB) data, and output to the screen for viewing for a short time for confirmation.

As will be described in more detail below, when a time corresponding to starting time of one of the reserved television program comes, the recording reservation setting section 9 produces a series of control signals to VCR 15 so as to switch on the VCR 15, select the channel as stored, and start the recording. Then, when a time corresponding to end time of that reserved television program comes, the recording reservation setting section 9 produces a series of control signals to the VCR 15 so as to stop the recording and to switch off the VCR 15.

The text broadcast receiver according to the preferred embodiment of the present invention determines by means of the data identifier section 3 whether the received data group is television program table data, and if it is, stores the television program table data to the program table data memory 6. When a timer reservation command is entered by the user, the contents of the program table data memory 6 are searched by means of the program table data control section 8 as commanded by the recording reservation setting section 9. It is automatically determined whether there is a television program table stored for the corresponding channel, and the result of this determination is displayed on screen. When the television program table is present, the timer reservation can be set by simply selecting the desired program from the television program table displayed on the screen. It is therefore not necessary for the user to determine whether or not there is a television program table available. The same operation can be used to select the timer reservation setting mode regardless of whether or not the television program table is present, and the same simple operation can be used without confusing the user even when new services are provided.

A text broadcast receiver according to the present invention enables a simple timer recording reservation operation using text broadcast television program table services, maintains compatibility with conventional timer recording reservation operations which do not depend on text broadcast, and thus effectively enables a simple timer recording reservation operation even when the text broadcast television program table service is not available without confusing the user.

The video cassette recording apparatus (e.g. VCR 15) of the television program recording and reproducing system according to the present invention will now be described in detail with reference to FIGS. 6 and 7.

Figure 6:
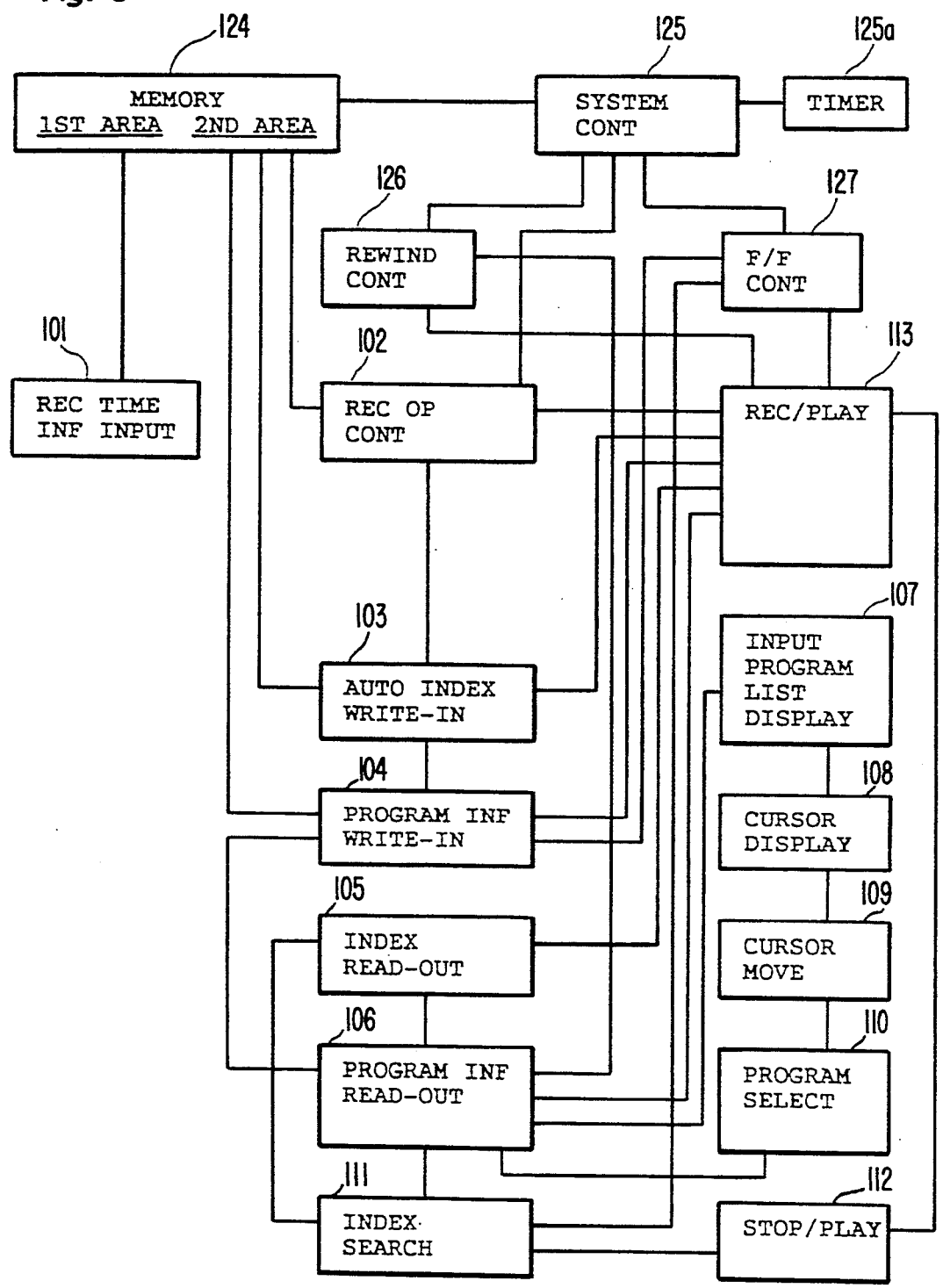
FIG. 6 is a block diagram of a video cassette recording apparatus of the television program recording and reproducing system according to the present invention.

As shown in FIG. 6, the VCR 15 of the television program recording and reproducing system is connected via a memory 124 (described below) to a recording time information input means 1 which inputs the recording time information such as channel number, date, recording start time, recording end time, and title of the program to be recorded. The input means 101 is formed by the text broadcast receiver described above and can also include a user operated device such as a keyboard or bar code reader for setting the program recording information.

The VCR 15 includes a recording operation control means 102 for starting or ending the recording operation based on the recording time information inputted by the recording time information input means 101; an automatic index write-in means 103 for automatically writing an index information indicating the recording start position on a recording medium, such as on a magnetic tape; a program information write-in means 104 for writing, when inputting the recording time information, the program information corresponding to the index information on the recording medium; and index read-out means 105 for reading out, at the time of reproducing, the index information written by the automatic index write-in means 103; a program information read-out means 106 for reading out, at the time of reproducing, the one or more pieces of recording time information such as, a channel number, date, recording start time, recording end time, title of the program to be recorded, etc., as inputted by said recording time information input means 101; an input program list display means 107 for displaying a list, at the time of reproducing, of the recorded program information as read out by the program information read-out means 106; a cursor display means 108 for displaying a cursor for pointing to one of a plurality of programs in the program list displayed by the program list display means 107; a cursor moving means 109 for moving the cursor displayed by the cursor display means 108 to change the pointing position of the listed programs; a program selection means 110 for selecting the program pointed to by the cursor moving means 109; an index search means 111 for searching the index corresponding to the program selected by the program selection means 110 through the tape; a stop/reproduce means 112 for stopping the search and reproducing the program which is found by the index search means 111; and a recording/reproducing section 113 provided in the video cassette recorder (VCR) for recording the television signal, or the like, on the recording medium and also for reproducing the recorded television signal from the recording medium.

The VCR 15 of the television program recording and reproducing system further includes: a rewind control 126 for controlling a rewinding mechanism (not shown) provided in the VCR; a fast forward control 127 for controlling a fast forward mechanism (not shown) in the VCR; and a system control 125 coupled with a timer 125a for controlling the rewind control 126, fast forward control 127 and recording operation control 102 to determine where and when the recording time information should be recorded.

Figure 1A:
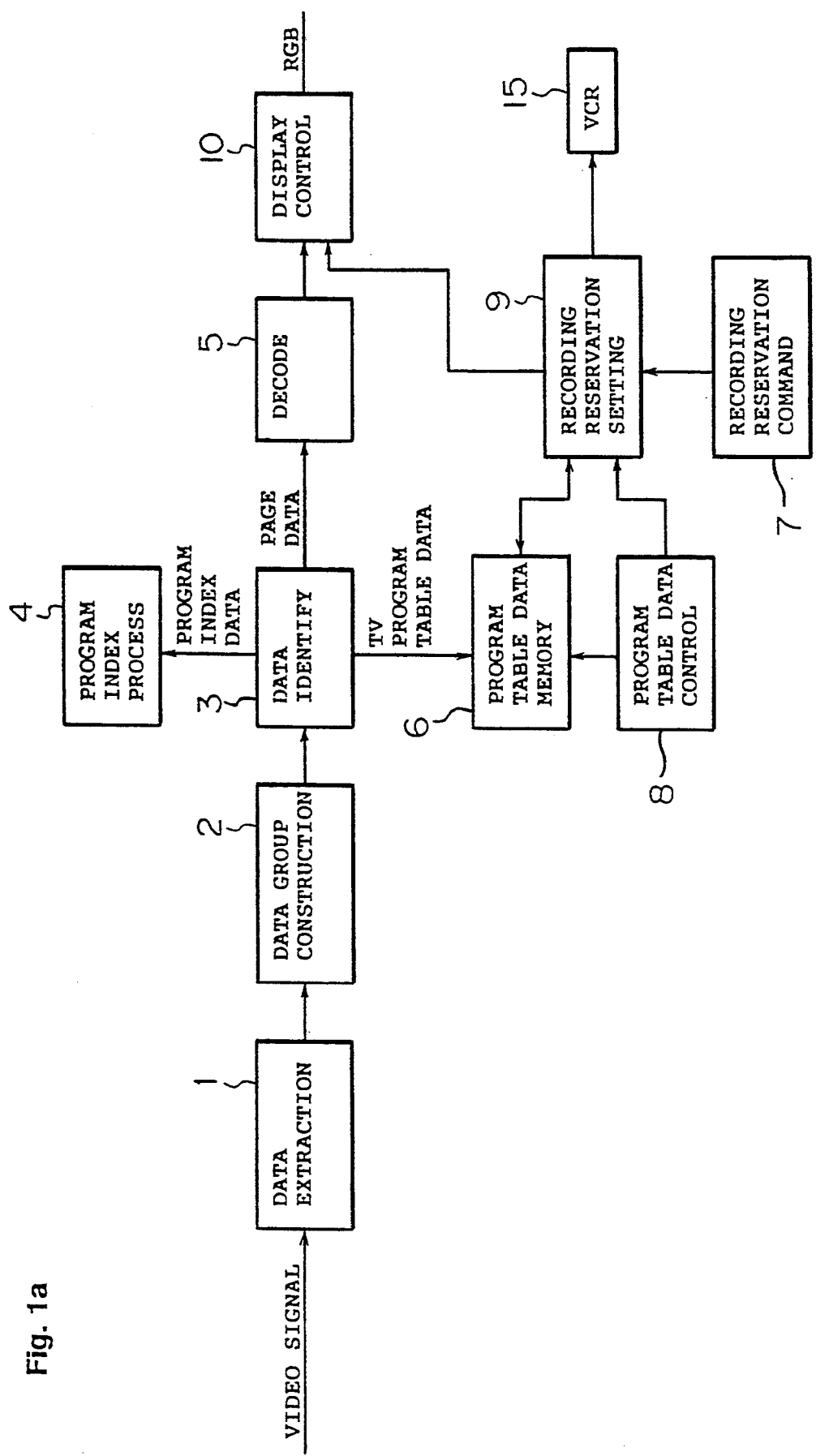
FIG. 1a block diagram of a text broadcast receiver of the television program recording and reproducing system according to the present invention.
Figure 1B:
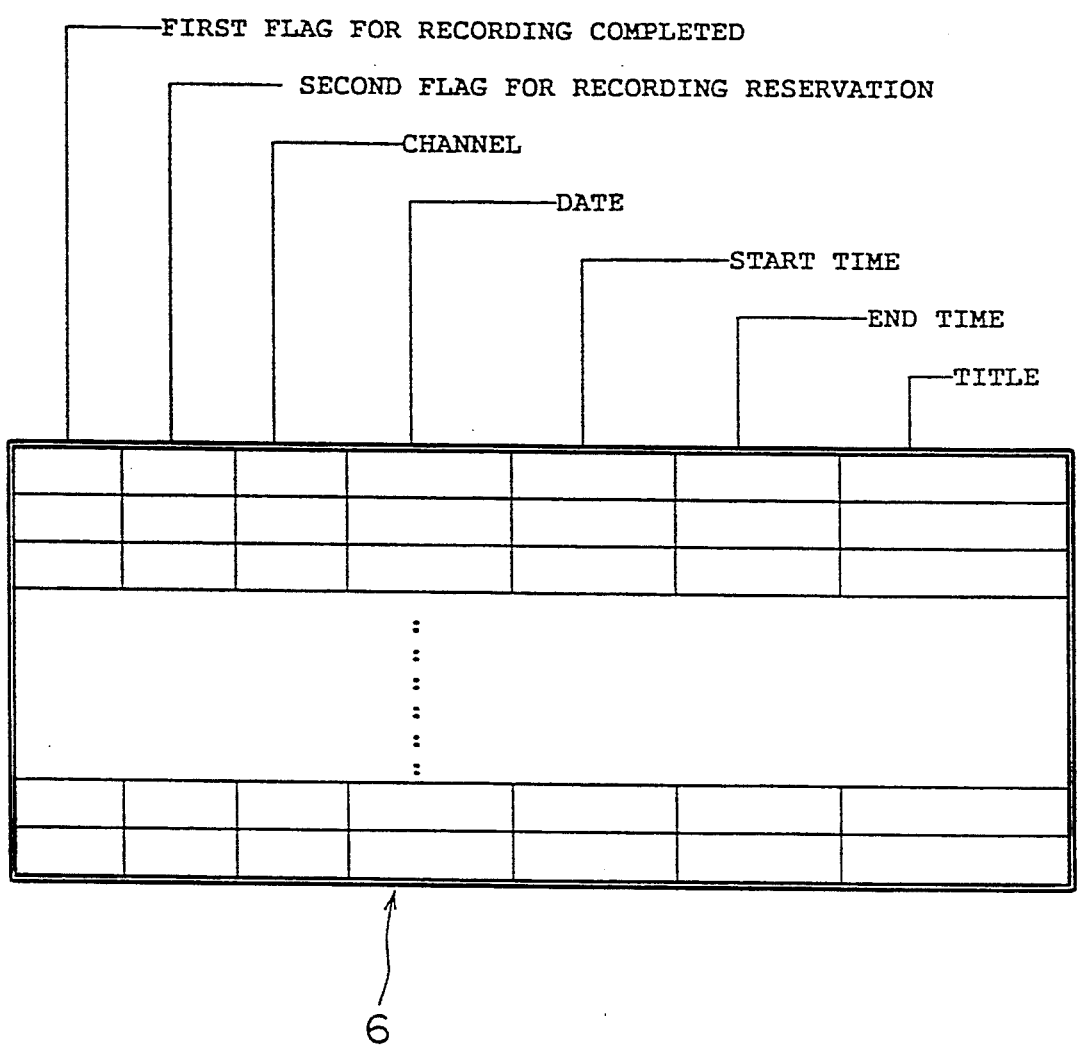
Figure 1C:
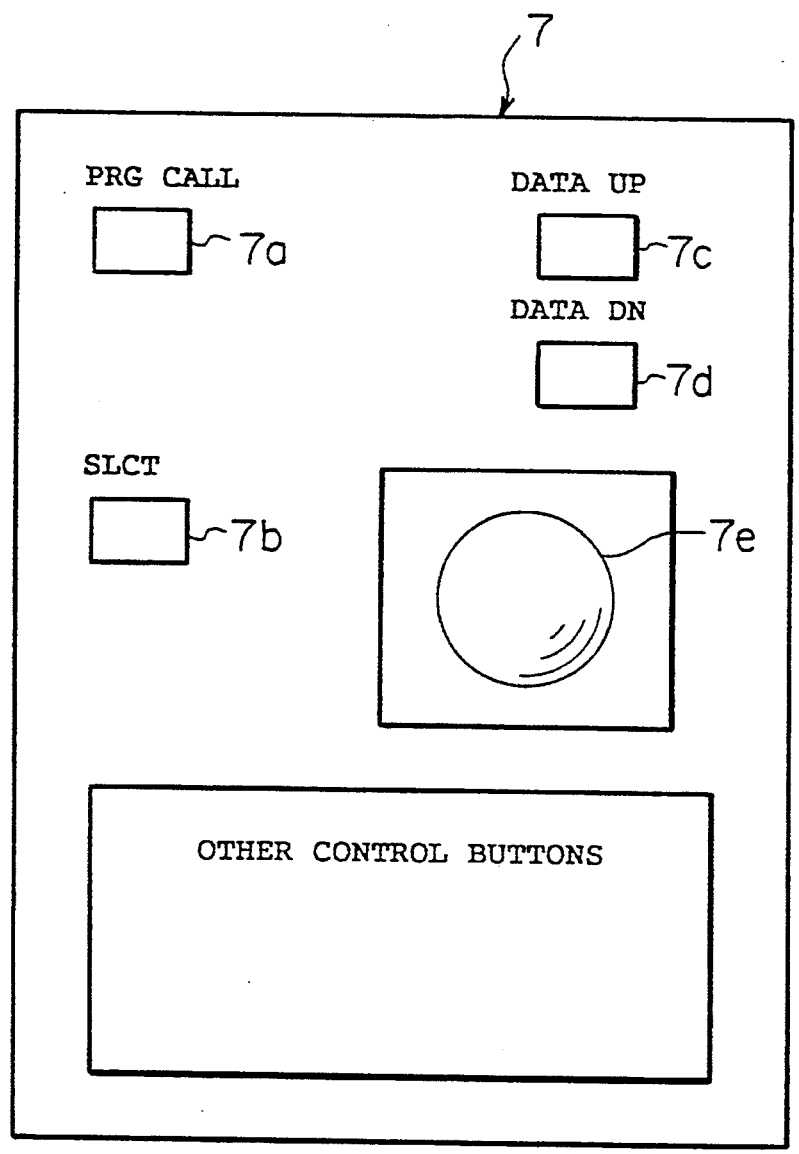

The memory 124 corresponds to the recording reservation setting means 9 of FIG. 1a in that the set program recording information is recorded therein. In other words, the memory 124 stores the recording program information contained in the text broadcast signal of the selected television program as described above in connection with FIGS. 1a–3c. As such, the input means 101 corresponds generally to the apparatus of FIG. 1a (except for VCR 15) and the memory 124 may be considered a part of the reservation recording means 9 of FIG. 1a. Further, as noted above, the input means 101 may also be formed of a user operated keyboard or bar code reader for setting program recording information to be stored in the memory 124.

The memory 124 includes first and second memory areas. The first memory area is for storing the recording time information such as, the channel number, date, recording start time, recording end time, and title of the program to be recorded as inputted by the input means 101. The second memory area is for storing similar data after the actual recording is started.

The operation of the above-described television program recording and reproducing system is given below with reference to FIGS. 8 and 9.

First, in the case of recording a number of programs, the recording time information input means 101 is operated to input various data, such as a channel number, date, recording start time, recording end time, and the title of program to be recorded. This operation is carried out to store a plurality of future programs in the first area in memory 124. It is assumed that the recording is to be carried out from the beginning of the tape. Then, when a cassette is inserted in the VCR, the system control 125 activates the rewind control 126 to rewind the cassette tape to an initial position at which the tape is completely wound on the supply reel, and at the same time, the index is reset to zero. A predetermined tape area at the beginning of the tape, particularly in the voice recording track, is preserved for storing the list of the recorded programs. Then, when the first recording start time arrives as stored in the first area in memory 124, the recording operation control means 102 operates the recording/reproducing section 113 to record the first inputted program. In this case, the index information indicating the recording start position in the tape is also written by the automatic index write-in means 103 in the second memory area in memory 124. Once the first program recording starts, the recording time information including the channel number, date, recording start time, recording end time, and the program title as stored in the first area in memory 124 is shifted to, or marked as, the second memory area in memory 124. This shifting may be done at the beginning, ending or therebetween of the recording of the first program. Then, when the recording of the first program ends, the auto index write-in means 103 writes in the second memory area in memory 124 the index information indicating the recording end position of the first program in the tape. Then, immediately thereafter, the system control 125 activates the rewind control 126 to rewind the tape to the initial position, and then, the program information write-in means 104 controls the recording/reproducing section 213 to write the data stored in the second area in memory 124 in the predetermined tape area at the beginning of the tape. Immediately thereafter, the system control 125 activates the fast forward control 127 to advance the tape to the end of the first recorded program in accordance with the index information stored in the second area in memory 124.

Thereafter, when the second recording start time arrives as stored in the first area in memory 124, the above operation is repeated so as to record the second program in the tape after the first program, and to add the second recorded program information in the list at the beginning of the tape, and to advance the tape to the end of the second recorded program, making it ready for storing the third program.

In the case where two subsequent programs to be recorded are very close to each other in terms of time, the adding of the recorded program information in the list may be carried out after the two subsequent programs are recorded. In this case, the system control 125 controls the system such that the program information to be added to the list for the two subsequent programs are maintained in the second area in memory 124 until the recording of the two subsequent programs are completed.

Alternatively, the recording of the program information in the list at the beginning of the tape can be carried out after the recording of the last program stored in the first area in memory 124 is completed. In this case, the program information to be added to the list for all the programs are maintained in the second area in memory 124.

Furthermore, alternatively, the recording of the program information at the beginning of the tape can be carried out when a tape eject button (not shown) is depressed. In this case, before ejecting the cassette tape, the system control 125 activates the rewind control 126 so that the tape is rewound to the initial position for recording the program information in the list.

Next, in the case of reproducing, or playing, the recorded program, the system control 125 activates the rewind control 126 so that a cassette tape inserted in the recording/reproducing section 113 is rewound to the initial position. Then, the list of the program information written at the beginning of the tape by the program information write-in means 104 is read out by the program information read-out means 6 upon control of the recording/reproducing section 113. The list of the program information as read out by the program information read-out means 106 is displayed on a screen by the list display means 107. An example of such a display on the screen is shown in FIG. 7. A program in the list on the screen can be selected by a cursor 108a, which is formed by cursor display means 108 and can be shifted by cursor moving means 9. When the cursor 108a is shifted to a desired program in the list, the program selection means 110 is operated to select the program pointed to by the cursor 108a. The program selection is carried out in such a manner that the program information selected by the program selection means 110 is marked in the list stored in the program information read-out means 106, and the index information representing the start position of the selected program is applied to the index searching means 111 as a target index. Then, the fast forward control 127 is operated to advance the tape at fast speed. In the index searching means 111, the target index as obtained from the program information read-out means 106 is compared with the index as read out by the index read-out means 105 during the fast advance of the tape. When the index from the index readout means 106 matches with the target index, the stop/reproducing means 112 is operated to stop the searching operation and to start the reproducing operation by the recording/reproducing section 113.

It is to be noted that the program information write-in means 104 is provided with a modulator for modulating the program information data obtained from memory 124 from digital form to analog form digital data which is capable of being recorded in the audio track in the tape. Similarly, the program information read-out means 106 is provided with a demodulator for demodulating the program information data obtained from the tape from analog form digital data to digital form capable of being processed for display on the screen.

As described above, according to the present invention, since the recorded program information is stored at the beginning of the tape, it is possible to display the list of the recorded program information when the tape is inserted in the VCR. Thus, it is possible to easily know the contents of the tape and, also to easily access the desired program recorded in the tape.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A television program recording and reproducing apparatus for recording a television program on a magnetic tape based on a television program data contained in a received video signal, comprising:

a data extraction means for extracting a data block in an encoded transmission-format test broadcast signal multiplexed with a vertical blanking period of a video signal;

a data group construction means for constructing a data group by assembling a plurality of extracted data blocks;

a data identifying means for identifying said data group and including a gate means for passing said data group when said data group is identified as containing a television program table, said program table including recording information with respect to at least one television program, said recording information including a channel information and a program start time and a program end time for each of said at least one television program;

a memory means for storing said recording information of said television program table contained in said data group passed through said gate means of said data identifying means, said memory means including respective memory areas for storing said channel information and said program start time and said program end time for each said television program of said television program table;

channel specifying means for specifying a channel responsive to an input instruction from a user;

detecting means for detecting whether said memory means includes recording information associated with the channel specified by said channel specifying means;

display means for automatically operating in either one of a first display mode and a second display mode in response to said detecting means, said display means operating in said first display mode when said detecting means detects that said memory means is devoid of recording information associated with the channel specified by said channel specifying means and operating in said second display mode when said detecting means detects that said memory means includes recording information associated with the channel specified by said channel specifying means, said first display mode including a displayed start time and a displayed end time as input by the user of a selected television program, and said second display mode including a display of a television program listing of television programs as stored in said memory means associated with the channel specified by said channel specifying means and a display cursor responsive to the user for specifying a selected television program from among the television program listing;

recording program information input means for inputting the recording information associated with the television program selected using said display means;

time detecting means for detecting a time at which recording of the selected television program is to start based on the program start time of said recording information input by said recording program information input means;

recording operation control means for controlling the recording of the selected television program in accordance with said time detecting means and said recording program information input by said recording program information input means;

index detecting means for detecting an index location on the magnetic tape to identify a section on the magnetic tape where the selected television program is recorded by said recording operation control means;

initial position returning means returning the magnetic tape to an initial position from the section on the magnetic tape where the selected television program is recorded by said recording operation control means; and information writing means for writing the recording information of the selected television program together with the index location at the initial position of the magnetic tape.

2. A television program recording and reproducing system as claimed in claim 1, further comprising advancing means for advancing the magnetic tape to the end of the section of the magnetic tape identified by the index location written at the initial position of the magnetic tape by said information writing means.

3. A television program recording and reproducing system as claimed in claim 1, wherein said recording program information input means has a memory for storing recording information of a plurality of television programs.

4. A television program recording and reproducing system as claimed in claim 3, wherein said information writing means writes the recording information of the plurality of recorded programs in a list format.

5. A television program recording and reproducing system as claimed in claim 1, further comprising:

reading means for reading a plurality of recording information written at the initial position of the magnetic tape, the plurality of recording information respectively denoting a plurality of recorded television programs recorded on the magnetic tape;

display means for displaying the plurality of recording information read by said reading means;

selecting means for selecting one of the plurality of recording information, denoting a desired one of the plurality of recorded television programs, displayed by said display means; and advancing means for advancing the magnetic tape to a section of the magnetic tape identified by an index location written in the initial position of the magnetic tape and associated with the one of the plurality of recording information selected by said selecting means.

6. A television program recording and reproducing system as claimed in claim 1, further comprising:

a second gate means of said data identifying means for passing said data group when said data group contains a program index data; and a program index processing means for processing said data group obtained from said second gate means of said data identifying means for controlling the program numbers for text broadcast programs.

7. A text broadcast receiver as claimed in claim 6, further comprising:

a third gate means of said data identifying means for passing said data group when said data group contains a page data; and a decoding means for decoding said data group obtained from said third gate means of said data identifying means into either one of visual data for display on a screen and audio data for producing sound from a loud speaker.

* * * * *